(12) United States Patent
Setton et al.

(10) Patent No.: US 8,010,862 B2
(45) Date of Patent: *Aug. 30, 2011

(54) MULTIMEDIA CONTENT DELIVERY USING PRE-STORED MULTIPLE DESCRIPTION CODED VIDEO WITH RESTART

(75) Inventors: Ezra Jacques Elie Eric Setton, Palo Alto, CA (US); Atsushi Shionozaki, Tokyo (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/690,867

(22) Filed: Jan. 20, 2010

(65) Prior Publication Data

US 2010/0182499 A1    Jul. 22, 2010

Related U.S. Application Data

(63) Continuation of application No. 10/815,254, filed on Mar. 31, 2004, now Pat. No. 7,676,722.

(51) Int. Cl.
*H04L 1/14* (2006.01)

(52) U.S. Cl. .................................. 714/750; 375/240.12
(58) Field of Classification Search .................. 714/748, 714/750, 751; 375/240.12
See application file for complete search history.

(56) References Cited

U.S. PATENT DOCUMENTS

| | | | | | |
|---|---|---|---|---|---|
| 4,975,957 | A | * | 12/1990 | Ichikawa et al. | 704/220 |
| 7,411,903 | B2 | * | 8/2008 | Jang et al. | 370/230 |
| 2003/0007515 | A1 | * | 1/2003 | Apostolopoulos et al. | 370/503 |
| 2005/0123045 | A1 | * | 6/2005 | Hannuksela | 375/240.12 |

* cited by examiner

*Primary Examiner* — Esaw T Abraham
(74) *Attorney, Agent, or Firm* — Blakely, Sokoloff, Taylor & Zafman LLP

(57) ABSTRACT

An embodiment of the present invention includes a buffer, a selector, and an analyzer. The buffer stores at least a default stream coded by a multiple description (MD) coding and a restart stream coded by a predictive coding. The default and restart streams correspond to a media content. The selector selects a transmit frame from the default and restart streams according to a transmission status. The transmit frame is transmitted to a receiver. The analyzer provides the transmission status based on feedback information provided by the receiver.

10 Claims, 12 Drawing Sheets

MULTIMEDIA CONTENT DELIVERY USING PRE-STORED MULTIPLE DESCRIPTION CODED VIDEO WITH RESTART

CROSS REFERENCES TO RELATED APPLICATIONS

This is a Continuation application of U.S. patent application Ser. No. 10/815,254, filed Mar. 31, 2004 now U.S. Pat. No. 7,676,722. This Continuation Application claims the benefit of the U.S. patent application Ser. No. 10/815,254 now U.S. Pat. No. 7,676,722.

BACKGROUND

1. Field of the Invention

Embodiments of the invention relates to the field of multimedia, and more specifically, to multimedia content delivery.

2. Description of Related Art

Multi-media content delivery systems need to address a large set of challenges to provide a high quality multimedia experience to the end user. A typical multimedia system may be unicast or multicast. In a unicast system, a client or customer is interested in receiving a particular video clip or movie from a media content server. In a multicast system, the media content server sends the multimedia content to a large number of clients.

There are several problems in the existing media content delivery systems. First, there may be losses in transmission resulting in dropped packets or significant delay. When this occurs, the system may freeze until the lost packet arrives at the client. In most cases, a start-up delay may occur causing interrupted viewing. Second, streaming media content over commodity network such as the Internet usually has very slow start-up time. The user has to wait for many seconds before the media can begin playing. Third, video quality may be degraded due to errors in decoding or transmission. Fourth, in multicast systems, the user does not have the flexibility to select an appropriate level of error recovery capability according to his or her requirements.

BRIEF DESCRIPTION OF THE DRAWINGS

The invention may best be understood by referring to the following description and accompanying drawings that are used to illustrate embodiments of the invention. In the drawings.

DESCRIPTION

Figure 1:
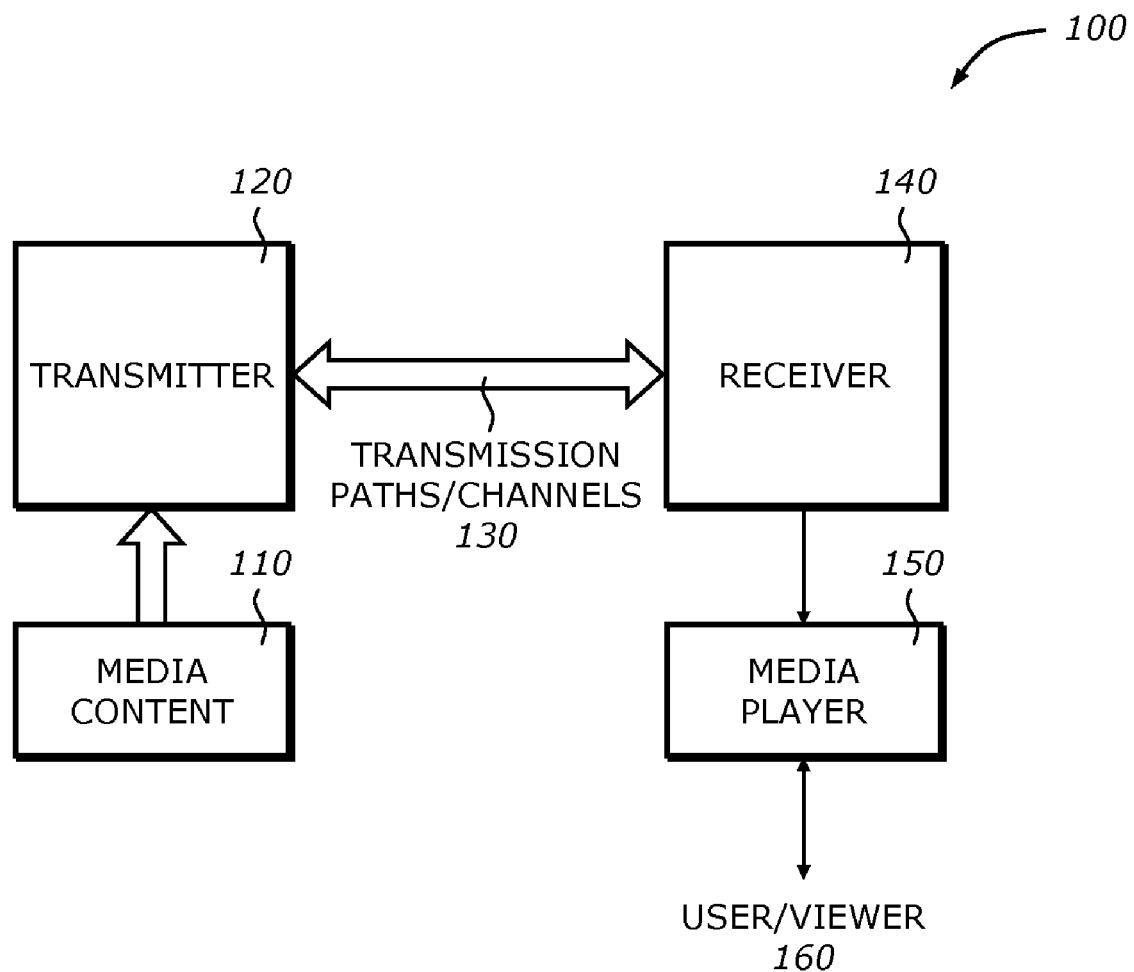
FIG. 1 is a diagram illustrating a unicast system in which one embodiment of the invention can be practiced.

An embodiment of the present invention includes a buffer, a selector, and an analyzer. The buffer stores at least a default stream coded by a multiple description (MD) coding and a restart sub-stream coded by a predictive coding. The default and restart sub-streams correspond to a media content. The selector selects a transmit frame from the default and restart sub-streams according to a transmission status. The transmit frame is received by, or transmitted to, a receiver. The analyzer provides the transmission status based on feedback information provided by the receiver.

An embodiment of the invention is an adaptive multipath streaming of prestored multiple description coded video with restart. A constant video quality is maintained by the use of multiple description coded video which ensures a sufficient video quality as long as one description is transmitted error free. A restart mechanism enhances the error resiliency of the system by providing a way of taking advantage of multiple description to stop error propagation. This is a fast and efficient way to recover from packet loss. Startup delays and application stalling are also avoided by suppressing the need for retransmissions. Errors are concealed until they are stopped by a stream restart. One embodiment of the invention allows to correct for errors on the fly rather than trying to retransmit lost packets before their display time. Retransmissions usually force systems to maintain a large buffer at the receiver to absorb additional latency whereas the technique in one embodiment of the invention only requires a very small buffer which compensates for jitters in the transmission time or in the decoding time.

An embodiment of the present invention includes a receiver, and a selector. The receiver receives a default stream and N restart sub-streams from a transmitter over a transmission path, N is an integer equal to at least 1 when restart is desired and is selected according to user selection by user or automatically without user intervention. When there is not enough bandwidth, or when restart is not desired, only the default stream is received. The default stream is coded by a multiple description (MD) coding. The N restart sub-streams are coded by a predictive coding and sampled according to a sampling pattern. The default and N restart sub-streams correspond to a media content. The selector selects a frame or packet from the default stream or a frame or packet from one of the N restart sub-streams according to a loss status in the default stream.

In the following description, numerous specific details are set forth. However, it is understood that embodiments of the invention may be practiced without these specific details. In other instances, well-known circuits, structures, and techniques have not been shown in order not to obscure the understanding of this description.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

FIG. 1 is a diagram illustrating a unicast system 100 in which one embodiment of the invention can be practiced. The system 100 includes a media content 110, a transmitter 120, transmission paths 130, a receiver 140, and a media player 150.

The media content 110 is any media content that is designed to transmit to a user or viewer. It may be a video sequence, an audio program, an audio-video content, a movie clip, etc. The transmitter 120 is a module located at a content delivery server to transmit the media content 110 to the receiver 140.

Transmission paths 130 include one or more transmission paths or channels over which the media content or is transmitted. In one embodiment, the transmission paths are channels of network such as the Internet. The streaming protocol may be any one of standard protocols used in the Internet, like the User Datagram Protocol (UDP) and the Internet Protocol (IP), or any typical extensions, or similar protocols such as the Real-Time Transport Protocol (RTP).

The receiver 140 is a module located at a client to receive the media content stream. The receiver 140 sends the decoded media stream to the media player 150. The media player 150 is any player that can play or display the decoded media stream to a user or viewer 160 on an output device such as a display screen, an audio output, or any combination of output devices.

Figure 2:
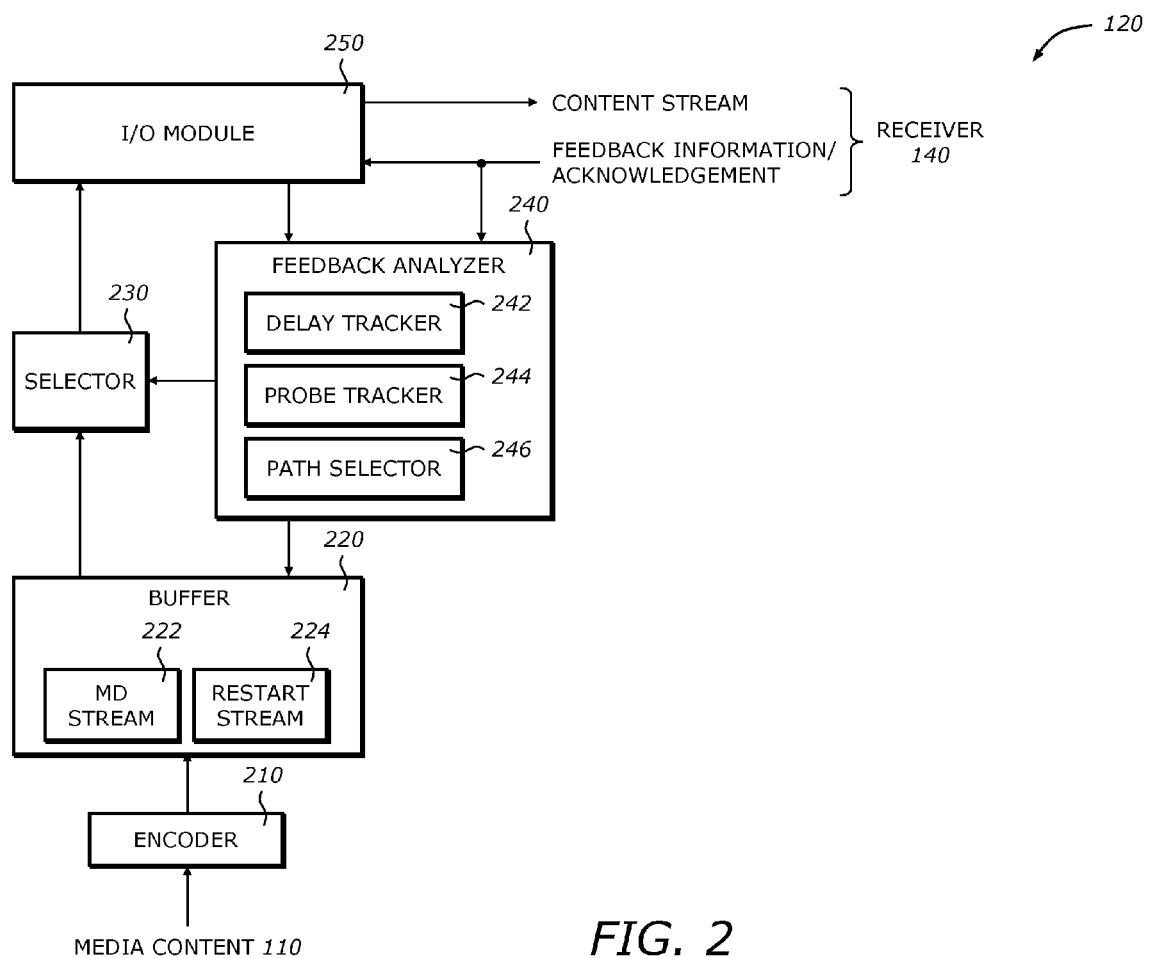
FIG. 2 is a diagram illustrating a transmitter according to one embodiment of the invention.

FIG. 2 is a diagram illustrating the transmitter 120 according to one embodiment of the invention. The transmitter 120 includes an encoder 210, a buffer 220, a selector 230, a feedback analyzer 240, and an input/output (I/O) module 250.

The encoder 210 encodes the media content 110 according to a coding technique. For video images, the encoding may be Motion Picture Experts Group (MPEG)-4 video and audio, or H.263 or H.264/Advanced Video Coding (AVC). In one embodiment, the encoder 210 encodes the media content 110 into two types of stream: a default stream and a restart sub-stream. The default stream is encoded using a multiple description (MD) coding. In the MD encoding, the media content is encoded into two or more separate bit-streams. Each stream has a different prediction loop and is independently decodable from the other(s). Typically, the different bit-streams are transmitted over different transmission paths or channels to reduce the probability that they are all lost. The restart sub-stream may be encoded by a standard predictive coding.

The buffer 220 stores the encoded streams in an MD stream 222 and a restart sub-stream 224. Both streams correspond to the same media content. By pre-storing the encoded media content, the content delivery may be performed efficiently.

The selector and packetizer 230 packetizes a transmit stream for transmission from the MD stream and the restart sub-stream in the buffer 220 and selects a packet or frame from the transmit stream or the restart stream according to a transmission status. The transmit stream is received by the receiver 140. In the normal mode, the default stream is selected as the transmit stream. After a packet or frame loss as indicated by the transmission status and at the time to transmit a packet or frame from the description having the packet or frame loss, the selector and packetizer 230 selects a packet or frame from the restart sub-stream as the transmit packet or frame. Thereafter the default stream is then selected. In essence, the selector and packetizer 230 selects a frame in the restart sub-stream to substitute for a frame in the default stream when there is a packet or frame loss and when it is time to transmit a frame.

The feedback analyzer 240 provides the transmission status to the selector and packetizer 230 based on the feedback information provided by the receiver 140. The analyzer 240 receives the feedback information from the I/O module 250. The feedback information may include the acknowledgment message and other status conditions. It detects lost packets and determines whether a frame from the restart sub-stream is substituted to the MD stream to stop error propagation.

The analyzer 240 also selects the best paths for transmission based on statistics or delay characteristics of the various transmission paths. To reduce the probability that all descriptions in the MD stream are lost, the transmission policy associates each video description with a separate transmission path as long as the statistics of these channels allow high quality communication. In this way, when errors occur on one path they only affect one description and keep the other streams untouched. The motivation for such a policy is the existence of burst errors on network paths. If the same channel holds all the streams, in the case of such failures, all the descriptions are lost which causes a large drop in the video quality. This issue is more important than the occurrence of random packet drops as MD coding is robust enough to overcome such losses. In order to select the best network paths for transmission, the feedback analyzer 240 tracks the delay characteristics of each channel. If the delay over a path does not exceed the maximum tolerated end-to-end delay (e.g., 150 ms) then it is considered good enough to hold a video stream, and if there are enough reliable channels, all the descriptions will be sent over different paths. Some channels between the transmitter 120 and the receiver 140 may not be used for sending video packets. This may happen when there are too many available channels or when channels do not have good enough statistics. In this case, the feedback analyzer 240 periodically sends probes along these paths which are acknowledged by the receiver 140. This maintains a constant flow of feedback, enabling the statistics of the paths to be updated regularly.

The feedback analyzer 240 includes a delay tracker 242, a probe tracker 244, and a path selector 246. The delay tracker 242 keeps track of the delay of each transmission path by measuring the time delay from the start of the sending of a packet to the receipt of the acknowledgment of that packet. As discussed above, if the delay is too long or exceeds some predetermined threshold (e.g., 150 msec), the transmission path that carries the media stream is determined to be undesirable. Only those paths that have desirable delay characteristics are kept in a group of good paths. The path selector 246 selects the M best paths from this group to be used as transmission paths for the M multiple descriptions of the MD stream. The probe tracker 244 tracks those transmission paths that are not used and sends probing messages (e.g., dummy messages) periodically to update the delay characteristics or other statistics. The probes have a special code in the header field in the packet to differentiate them from video data in the default or restart sub-streams. This header is extracted by the feedback generator in the receiver 140 to create acknowledgement. This maintains a constant flow of feedback information to allow the statistics of the paths to be updated regularly. The path selector 246 therefore can select the transmission paths dynamically or real-time according to the dynamics of the network.

The I/O module 250 provides the interface to transmit the content stream to the receiver 140 and to receive the feedback information from the receiver 140. The I/O module 250 sends the transmit stream as selected by the selector and packetizer 230. It also forwards or passes the feedback information to the feedback analyzer 240.

Figure 3:
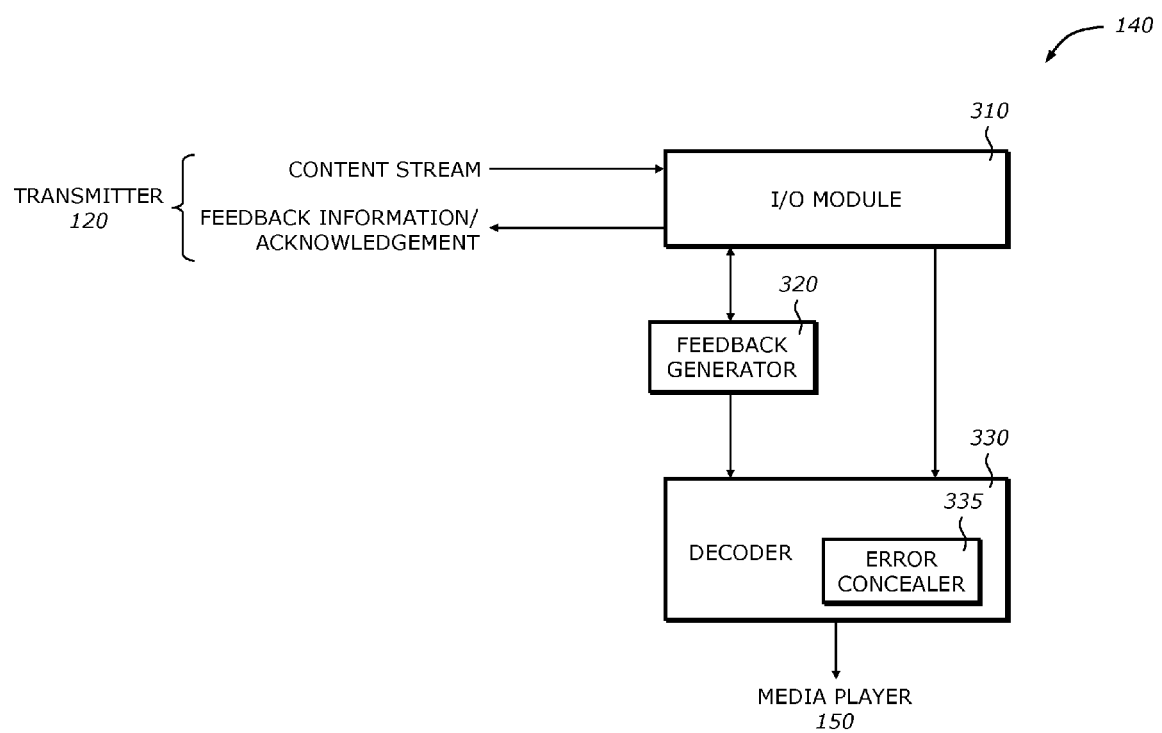
FIG. 3 is a diagram illustrating a receiver according to one embodiment of the invention.

FIG. 3 is a diagram illustrating the receiver 140 according to one embodiment of the invention. The receiver 140 includes an I/O module 310, a feedback generator 320, and a decoder 330.

The I/O module 310 provides an interface to receive the transmit or content stream sent by the transmitter 120. The content stream may be a default stream coded in a MD coding or a restart sub-stream coded in a predictive coding. The I/O module 310 also sends the feedback information to the transmitter 120 and the input to the feedback generator. The feedback information may include an acknowledgment of receipt of a packet or other status information.

The feedback generator 320 provides the feedback information to the I/O module 310 and to the decoder 330. The feedback information sent to the decoder 330 may include the type of encoding scheme used in the received content stream.

The decoder 330 decodes the received content stream as forwarded by the I/O module 310 according to the type of the encoding scheme as detected by the feedback generator 320. The decoder 330 then sends the decoded content stream to the media player 150. The decoder 330 includes an error concealer 335 to conceal the error when there is a packet or frame loss. The concealing may be performed by sending the previously decoded frame or extrapolating the previously received frames.

Figure 4:
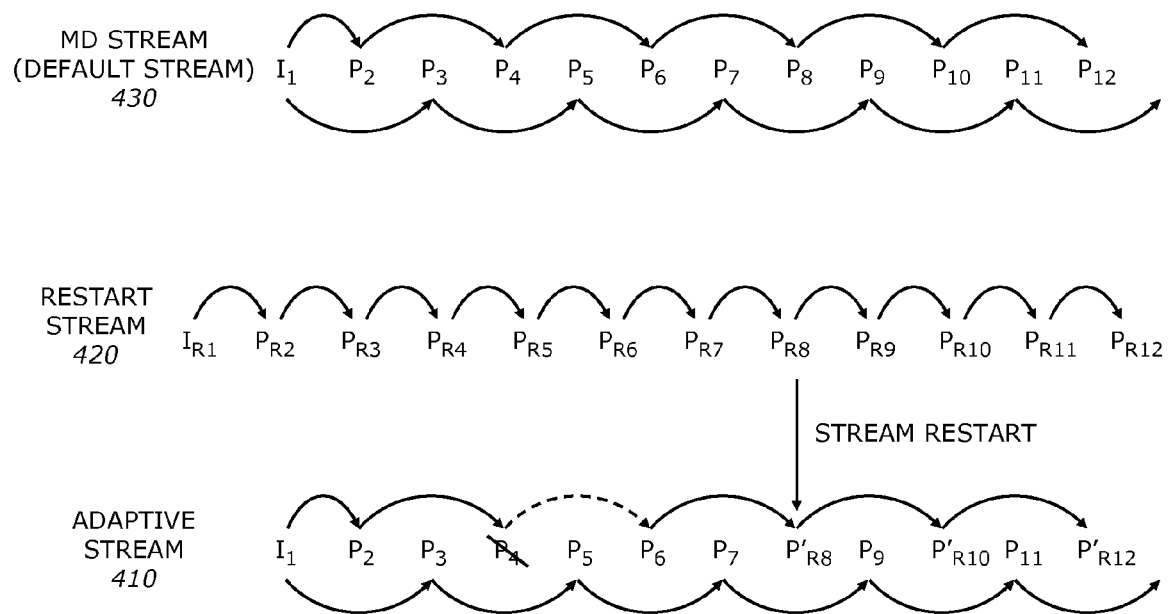
FIG. 4 is a diagram illustrating an adaptive stream according to one embodiment of the invention.

FIG. 4 is a diagram illustrating an adaptive stream 410 according to one embodiment of the invention. The adaptive stream 410 is generated from a default stream 430 and a restart sub-stream 420. Each of the default stream 430 and the restart sub-stream 420 include a group of pictures (GOP). The length of these GOPs does not need to be equal and is typically adapted to the network condition.

The default stream 430 is encoded by a MD encoding. It includes a reference I frame $I_1$ and subsequent predictive frames $P_2, P_3, \ldots P_N$. The MD stream 430 has two frame-interleaved streams that are independently encoded. The first stream includes the sequence $I_1, P_2, P_4, P_6, P_8, \ldots$. The second stream includes the sequence $I_1, P_3, P_5, P_7, P_9, \ldots$. As is known by one skilled in the art, more than two streams may be used. As the number of descriptions increases, the robustness of the stream also increases at the cost of a lower coding efficiency.

The restart sub-stream 420 is used to restart the content stream when there is a restart condition such as when there is a packet loss as detected by the feedback analyzer 240 (FIG. 2). The restart sub-stream 420 includes the sequence $I_{R1}, P_{R2}, P_{R3}, P_{R4}$, etc. which correspond to the sequence $I_1, P_1, P_2, P_3, \ldots$, respectively.

In normal condition (e.g., when there is no packet loss), the frames from the MD bitstream 430 are sent in their natural order along multiple transmission paths according to a transmission policy. When a frame (or packet) is dropped or lost, the decoder 330 conceals the error by replacing the missing frame by another frame (e.g., the previously decoded frame). This decoding error will affect the quality of subsequent frames of the same description. To stop this error propagation, the transmitter 120 sends one frame from the restart bitstream 420. For example, as illustrated in FIG. 4, suppose the lost frame is frame $P_4$. Due to the delay in analyzing the feedback information, the decision to send the restart frame is not effective till frame $P_8$. At that time, instead of sending frame $P_8$, the transmitter 120 sends frame $P_{R8}$. The frames in both bitstreams correspond to the exact same image, but are encoded using different references.

When the substitution is made, the reference of the restart frame lies in the error-free description and the frame can thus be used to break the affected prediction chain. After this restart step, transmission of frames from the MD bitstream 430 resumes and the substituted frame is used as a reference for the next frame of the restarted description.

Replacing a P-frame with another P-frame originating from another predictive structure may cause a slight mismatch at the decoder. This comes from quantization differences which result from using different encoding references. This phenomenon happens twice during the restart process: first when the restart frame is decoded and further on when this frame is used as decoding reference. In the example shown in FIG. 4 the frames in which this mismatch would occur during the decoding process are frame 8, 10 and 12. When the video compression is lossless (i.e., no quantization), decoded images from the two bitstreams are identical, as they are identical to the original frames, and there is no such mismatch. To increase the compression of the bitstream, the quantization step needs to be increased. In this case, there is usually a mismatch due to quantization differences but it is hardly noticeable visually. However, the mismatch fades out as new frames are decoded and the influence of the restart frame is eventually filtered out.

Figure 5:
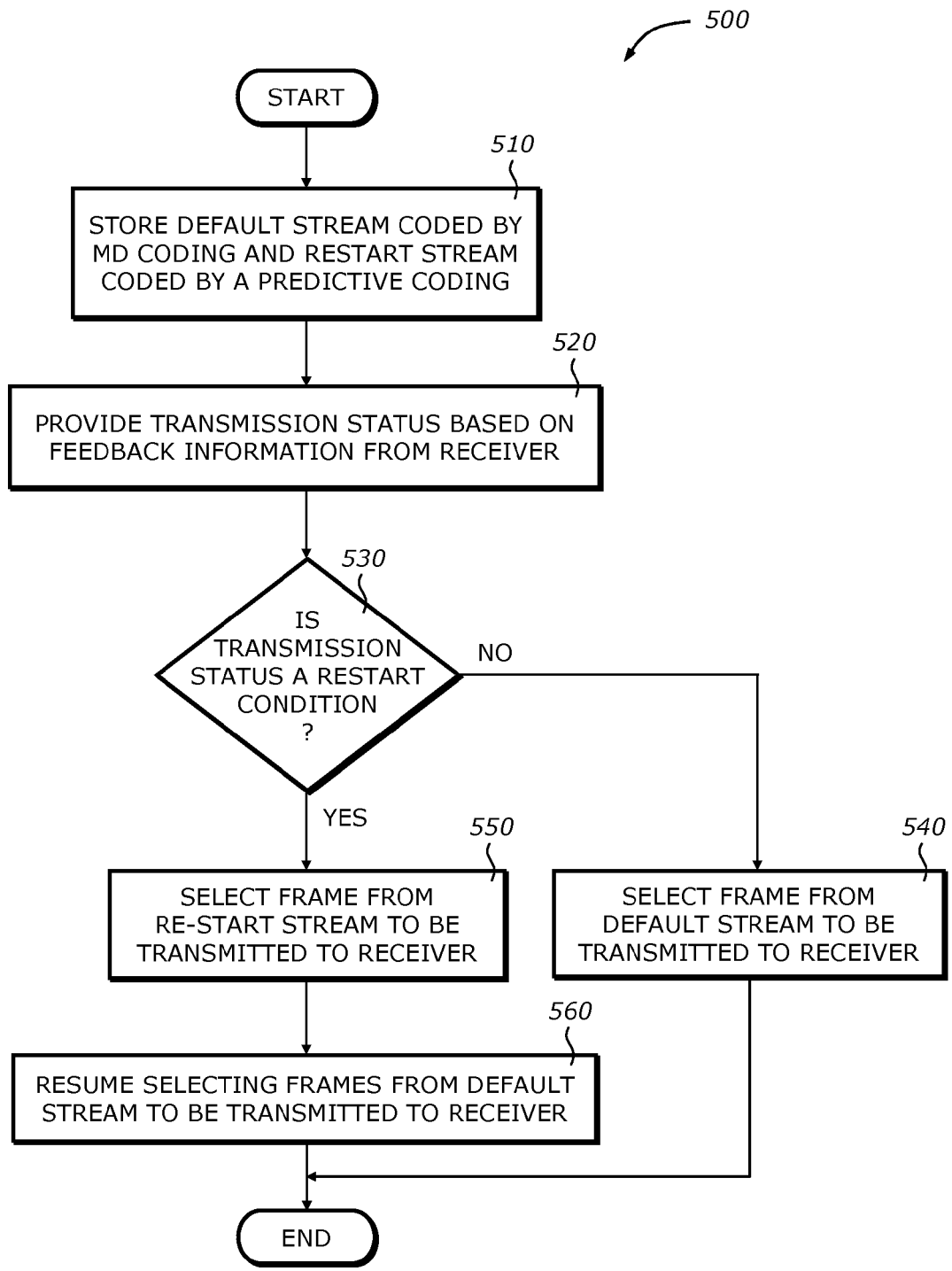
FIG. 5 is a flowchart illustrating a process to transmit a stream according to one embodiment of the invention.

FIG. 5 is a flowchart illustrating a process 500 to transmit a stream according to one embodiment of the invention.

Upon START, the process 500 stores the default stream coded by the MD coding and the restart sub-stream coded by a predictive coding in a buffer (Block 510). The encoding is typically performed off-line and/or only once throughout the history of the content delivery. Next, the process 500 provides a transmission status based on feedback information from the receiver (Block 520). Then, the process 500 determines if the transmission status is a restart condition (Block 530). A restart condition is characterized by two attributes: a past packet or frame loss has been detected by the feedback analyzer, and the transmission time is the time to transmit a packet or frame of the default stream that belongs to the description having the packet or frame loss. If it is not a restart condition, the process 500 selects the default stream to be transmitted to the receiver and is then terminated. If it is a restart condition, the process 500 selects a frame corresponding to the lost frame in the restart sub-stream to be transmitted to the receiver (Block 550). Then, the process 550 resumes selecting the default stream to be transmitted to the receiver (Block 560) and is then terminated.

Figure 6:
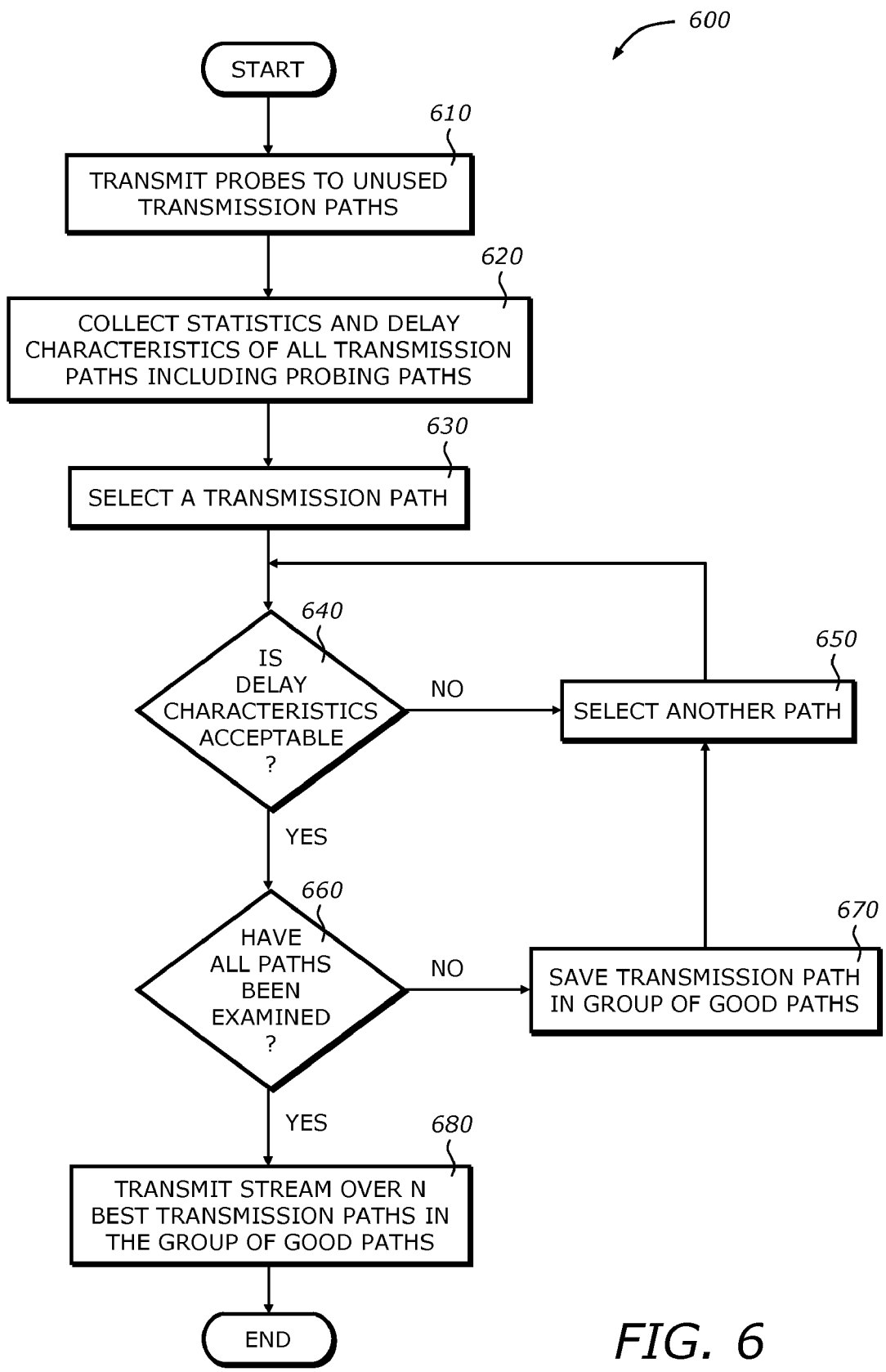
FIG. 6 is a flowchart illustrating a process to select transmission paths according to one embodiment of the invention.

FIG. 6 is a flowchart illustrating a process 600 to select transmission paths according to one embodiment of the invention.

Upon START, the process 600 transmits probes to unused transmission paths in the network (Block 610). These unused paths are part of the transmission paths that are available for delivery of the media content. Next, the process 600 collects statistics and delay characteristics of all the transmission paths including the probing paths (Block 620).

Then, the process 600 selects a transmission path to examine (Block 630). Next, the process 600 determines if the delay characteristics of the selected path is acceptable (Block 640). If not, the process 600 selects another path (Block 650) and return to Block 640. Otherwise, the process 600 determines if all the paths have been examined (Block 660). If not, the process 600 saves the selected transmission path in a group of good paths (Block 670) and goes to Block 650. Otherwise, the process 600 transmits the streams over the N best transmission paths in the group of good paths (Block 680). N is the number of the streams in the MD stream. Then, the process 600 is terminated.

Figure 7:
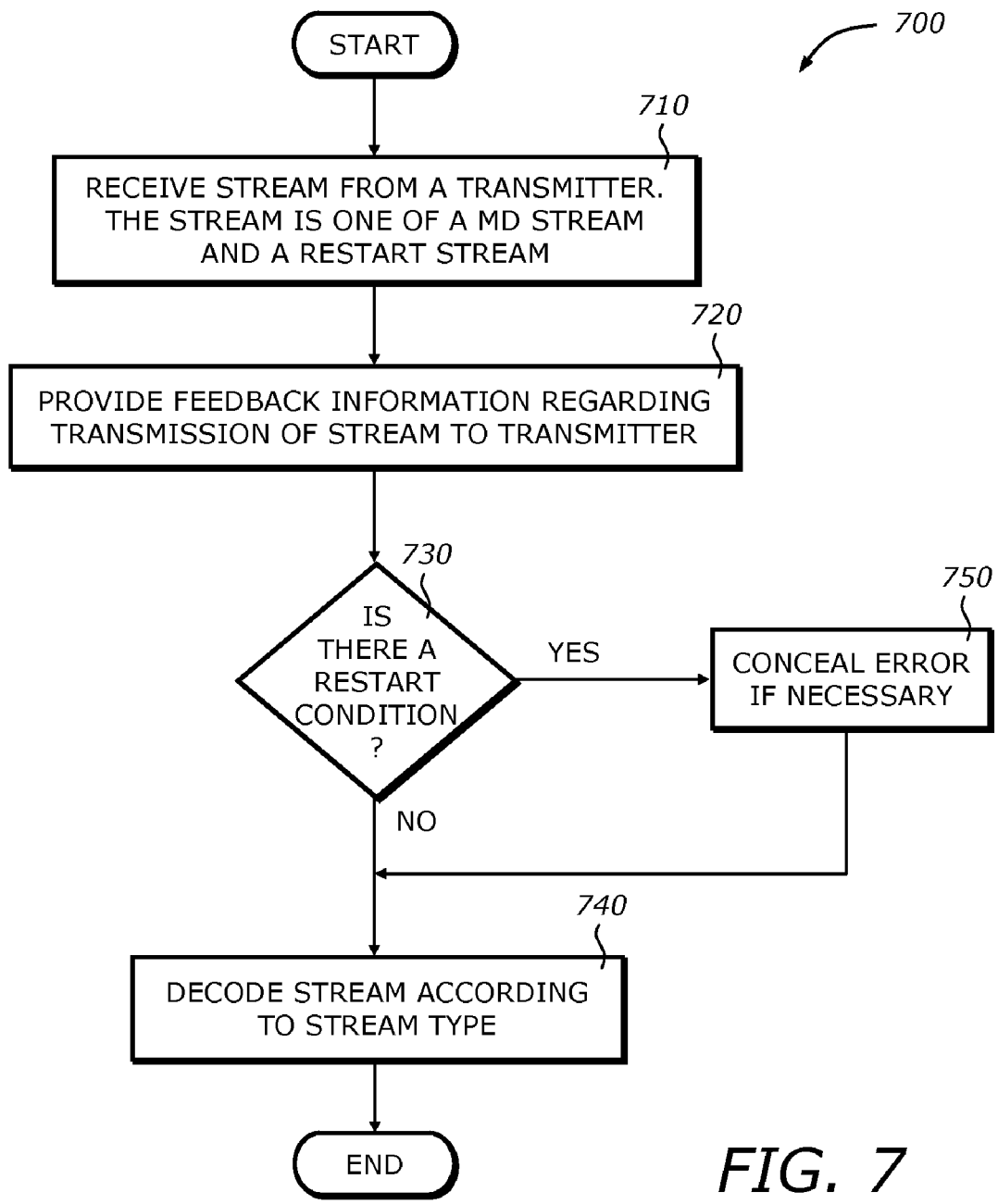
FIG. 7 is a flowchart illustrating a process to receive a stream according to one embodiment of the invention.

FIG. 7 is a flowchart illustrating a process 700 to receive a stream according to one embodiment of the invention.

Upon START, the process 700 receives the content stream from a transmitter (Block 710). The stream is one of a MD stream and a restart sub-stream. Next, the process 700 provides the feedback information regarding the transmission of stream to the transmitter (Block 720).

Then, the process 700 determines if there is a packet or frame loss (Block 730). If not, the process 700 decodes the stream according to the type of the stream (Block 740) and is then terminated. Otherwise, the process 700 conceals the error if necessary (Block 750) and then goes to Block 740.

A multicast system is preferably scalable. When the number of users increases, the same quality of service needs to be provided while maintaining stability. Therefore, multicast systems usually transfer most of their complexity to the clients or end users, and restrict to a minimum the use of feedback. The unicast system shown in FIG. 1 may be modified to provide multicast capabilities. The basic concept of using restart sub-stream when there is a packet or frame loss can be used. The main difference is that there are multiple restart sub-streams generated by choosing subsets of packets or frames of the original restart stream and the selection of the restart sub-stream is performed at the receiver instead of at the transmitter as in the unicast system. The technique for multicast systems provides in a scalable fashion, a varying level of error recovery capabilities to different types of users by using different restart multicast streams.

Figure 8:
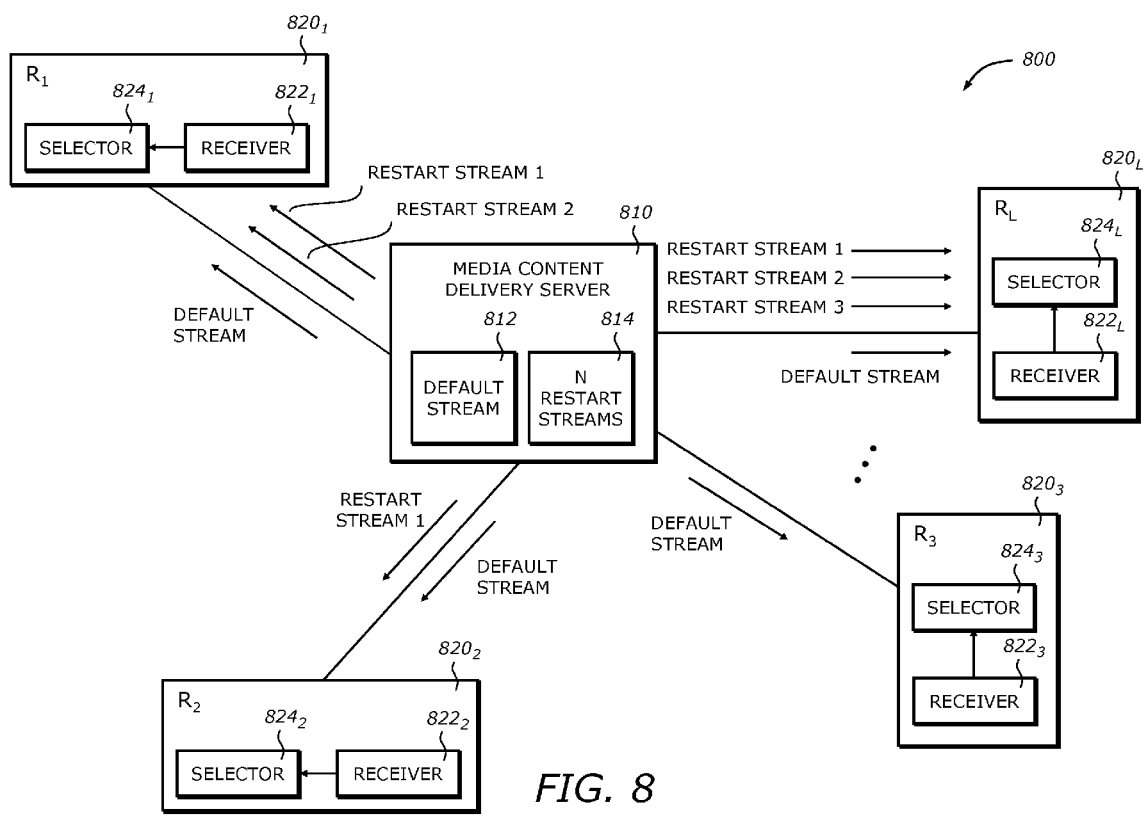
FIG. 8 is a diagram illustrating a multicast system in which one embodiment of the invention can be practiced.

FIG. 8 is a diagram illustrating a multicast system 800 in which one embodiment of the invention can be practiced. The system 800 includes a media content delivery server 810 and L clients $820_1$ to $820_L$.

The media content delivery server 810 is a server that delivers media content to a number of clients or client servers in multicast delivery mode. It includes pre-stored encoded streams that correspond to the media content to be delivered to the clients. The pre-stored streams include a default stream 812 and N restart sub-streams 814. The default stream 812 is encoded using a multiple description (MD) coding as in the unicast system described above. The default stream is the data stream that contains the media content to be delivered to the clients. The N restart sub-streams are used to restart the received default stream in the event of a packet loss in the default stream. The N restart sub-streams may be encoded by a standard predictive coding. They are sampled according to a sampling pattern. The number N is selected to accommodate the highest bandwidth of the transmission paths.

The L clients $820_1$ to $820_L$ receive the media content delivered by the media content delivery server 810. They may form into several multicast groups. Clients in each group may have similar bandwidth, error resiliency, and video quality requirements. Each client $820_k$ has a receiver $822_k$ (k=1, ... K) to receive the default stream and the subscribed restart sub-stream and that can adapt the client's subscription to the channel bandwidth and to the loss rate the client experiences. Typically, each client may analyze the network conditions and decide on the suitable tradeoff between video quality and error resiliency. When the state of the channels changes, clients leave multicast groups or join new ones to adapt to long term variations. When packets from the default or data stream are lost, the receivers $822_k$'s at the clients use the next available restart packet or frame to stop error propagation by operating a packet substitution.

The higher the bandwidth and the higher the loss rate, the higher the number N of the restart sub-streams that a client may request. For example, client $820_L$ has high bandwidth and high loss rate. Therefore, it subscribes to three restart sub-streams. Client $820_2$ has a lower bandwidth and therefore subscribes to only one restart sub-stream.

The L client's $820_1$ to $820_2$ include selectors $822_1$ to $822_L$, respectively. Each of the selectors $822_1$ to $822_L$ selects a receiving frame from the default stream and the subscribed N restart sub-streams according to a loss status in the default stream.

Figure 9:
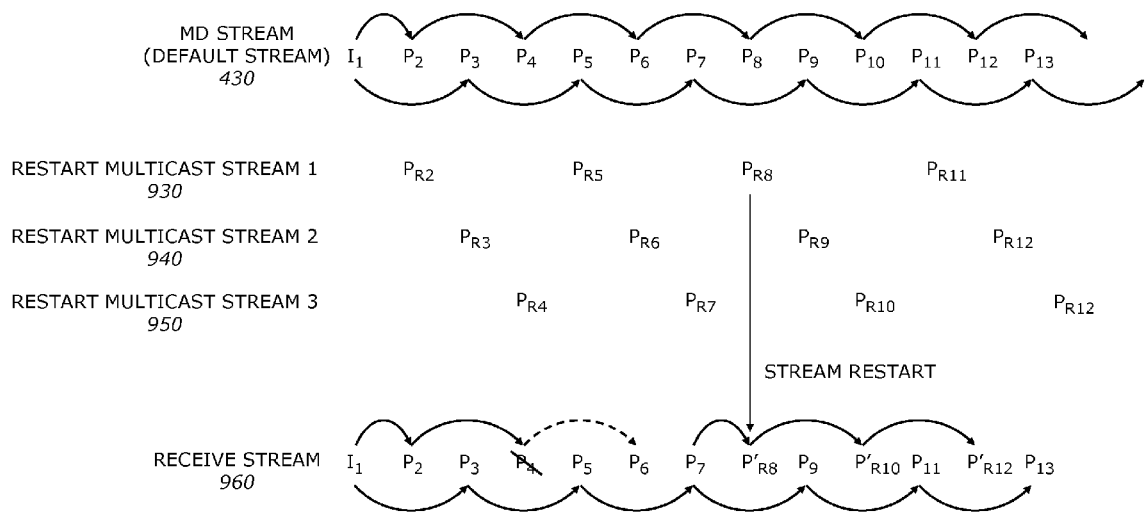
FIG. 9 is a diagram illustrating a receive stream according to one embodiment of the invention.

FIG. 9 is a diagram illustrating a receive stream 960 according to one embodiment of the invention. The receive stream 960 is formed from a default stream 910 and a restart sub-stream 920.

The default stream 910 and the restart sub-stream 920 are similar to those described for the unicast system above. The restart sub-stream 920 provides a basis to generate restart multicast sub-streams. In the example shown in FIG. 9, there are three (N=3) restart multicast sub-streams 930, 940, and 950.

The multicast sub-streams 930, 940, and 950 are the sampled versions of the original restart sub-stream 920. Each of the restart multicast sub-streams 930, 940, and 950 may have any data rate and follow any sampling pattern. However, to reduce bandwidth overhead, the sampling pattern is typically a non-overlapping pattern. In addition, each restart sub-stream may incorporate frames from each description to allow efficient restart capabilities to each user.

Each client receives the default stream 910 and a number of restart multicast sub-streams according to its bandwidth and/or loss rate requirements. All clients subscribe to a multicast group associated to the default stream 910 and a combination of the restart multicast sub-streams. When there are no losses, the clients discard the restart multicast sub-streams or packets and select packets or frames from the default stream to their decoder.

The receive stream 960 is the stream as sent by the I/O module of the receiver to the decoder. In the example shown in FIG. 9, the client only subscribes to the restart multicast sub-stream 930 and frame $P_4$ is lost. Taking into account the delay to receive a restart stream corresponding to the description of the MD stream in which the loss has occurred, the nearest useful restart frame is frame $P_{R8}$. Frame $P_{R8}$ is then substituted in the receive stream 960. When the substitution is made, the reference of the restart frame $P_{R8}$ lies in the error-free description and the frame can thus be used to break the affected prediction chain. After this restart step, the client goes back to the MD bitstream and the substituted frame is used as a reference for the next frame of the restarted description. Replacing a frame from the MD stream with a restart frame discontinues the predictive structure which allows the error to propagate. In a best case scenario, a lost frame would be immediately replaced by a restart frame and a restart step may be performed using a packet substitution, mismatched decoding and mismatched prediction in the decoding of the next frame of the description. When the clients subscribe to more restart sub-streams, their error recovery capabilities increase as there are more positions at which they can restart a description. Note that the presence of I frames in the MD stream makes the scheme more robust to losses which would affect simultaneously both descriptions. In this case, if no restart is possible, some decoding errors may occur until the next I frame is received. The existence of a slight decoding mismatch caused by the substitution is analyzed above in the unicast system. In this example it would affect frames 8, 10 and 12.

Figure 10:
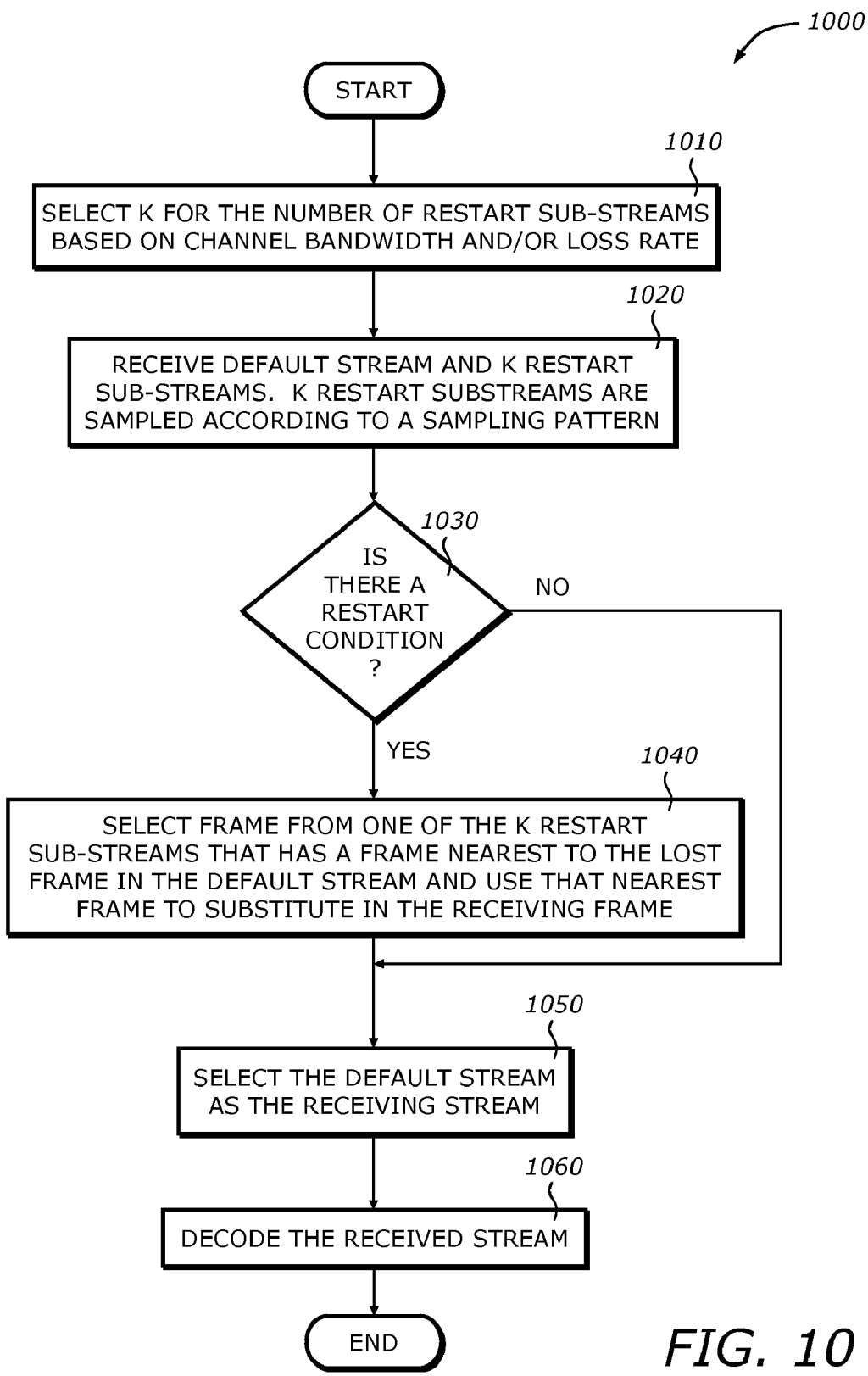
FIG. 10 is a flowchart illustrating a process to receive a stream according to one embodiment of the invention.

FIG. 10 is a flowchart illustrating a process 1000 to receive a stream according to one embodiment of the invention.

Upon START, the process 1000 selects K for the number of restart sub-streams based on channel bandwidth and/or loss rate (Block 1010). Then, the process 1000 receives packets from the default stream and from the K restart sub-streams from the media content delivery server (Block 1020). The K restart sub-streams are sampled according to a sampling pattern. Next, the process 1000 determines if there is a restart condition (Block 1030). A restart condition is characterized by one attribute: a past packet or frame loss has been detected by the feedback generator. If not, the process 1000 goes to Block 1050. Otherwise, the process 1000 selects a received packet or frame in one of the K restart sub-streams. The selected packet is the packet nearest to the lost frame in the default stream which corresponds to the description stream having the packet or frame loss. The process 1000 uses that frame and substitutes it in the receive stream (Block 1040). Next, the process 1000 selects the default stream as the receiving stream to resume normal mode (Block 1050) and is then terminated.

Figure 11:
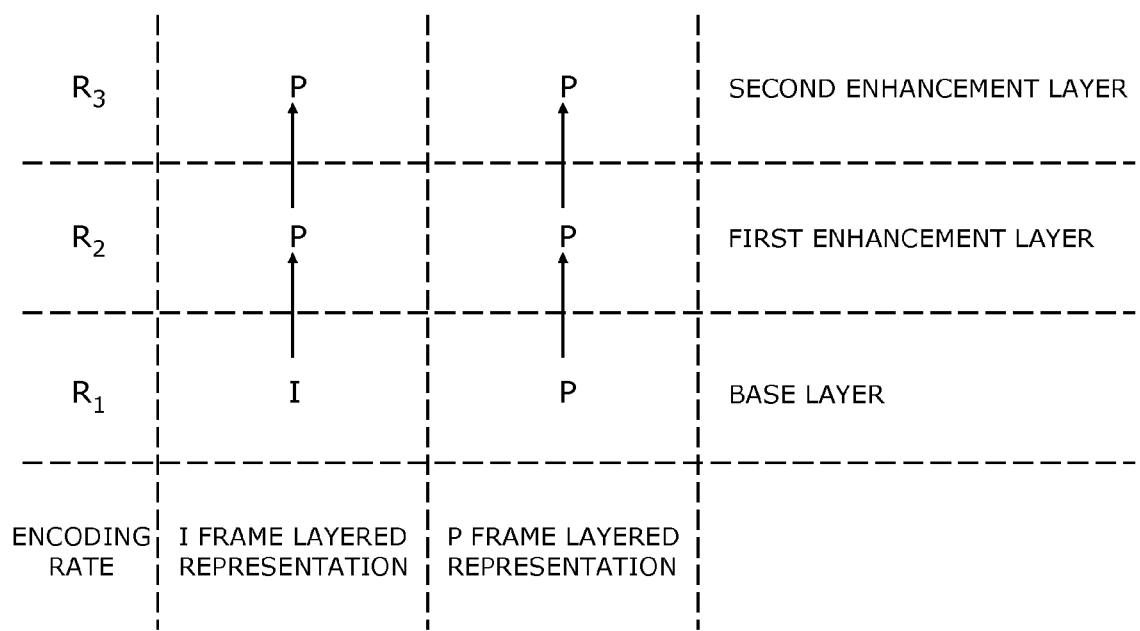
FIG. 11 is a diagram illustrating layered representations of I and P frames according to one embodiment of the invention.

FIG. 11 is a diagram illustrating layered representations of I and P frames according to one embodiment of the invention. FIG. 11 illustrates layered representations for the streams used for bandwidth adaptation.

There is a 3-layer encoding for an I frame and for a P frame. These three layers correspond to three different encoding rates R1, R2, and R3. The base layer is comparable to normally encoded frames. Enhancement layers add finer granularity to the frames. They can only be decoded if the preceding layers have been decoded, as depicted by the prediction arrows in the figure. Thus the base layer of an I frame may be decoded independently and will be the reference to decode the next enhancement layer. In the case of a P frame, the decoding of the base layer will rely on a previously decoded reference frame, and this base layer will also be the reference to decode the next enhancement layer. This kind of encoding is part of video standards such as H.263+ and other scalable codecs. When used in the multicast technique discussed above, each layer of the video data and of the restart data is sent to a different multicast group, offering full bitrate scalability. Thus the users would have two degrees of freedom: The video quality and the error recovery capability. In reality users could choose a different video quality for the MD stream and for the restart sub-stream. However, the effectiveness of the restart is increased when the quality of the two streams is equal. This would lead the viewers to always select an equal number of enhancement layers from both the MD and the restart sub-stream.

Figure 12:
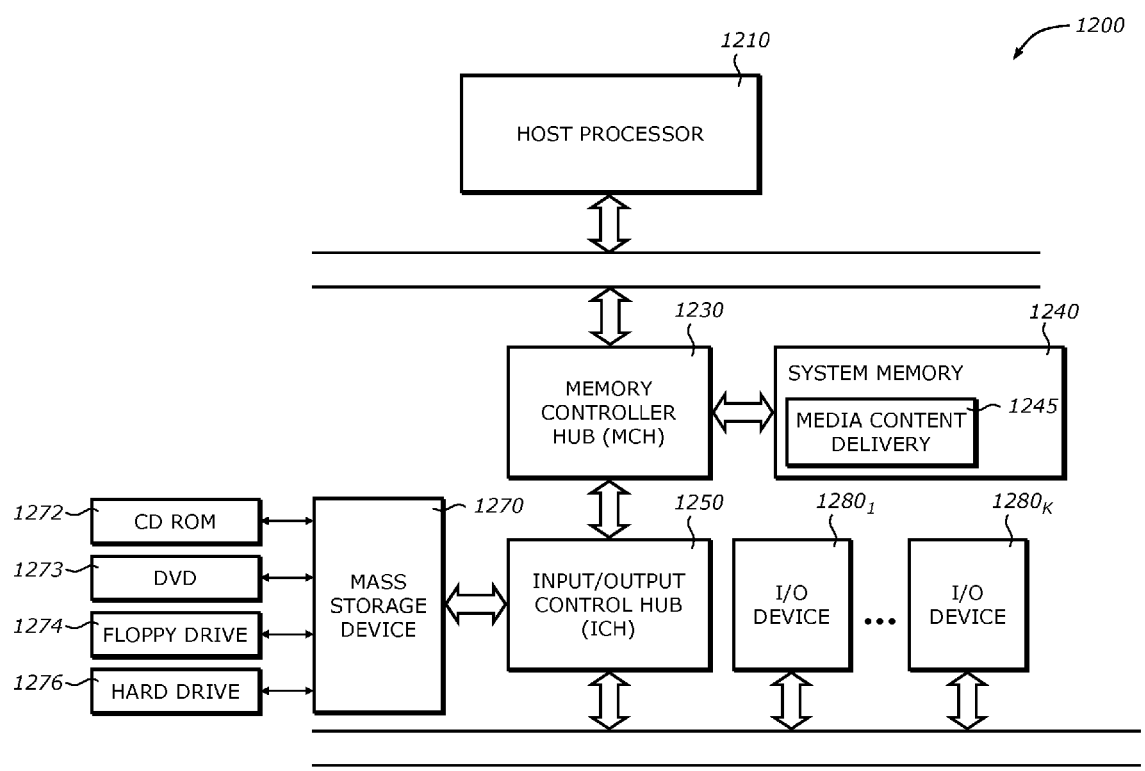
FIG. 12 is a diagram illustrating a computer system according to one embodiment of the invention.

FIG. 12 is a diagram illustrating a system 1200 in which one embodiment of the invention can be practiced. The system 1200 includes a host processor 1210, a memory control hub (MCH) 1230, a system memory 1240, an input/output control hub (ICH) 1250, a mass storage device 1270, and input/output devices $1280_1$ to $1280_K$. Note that the system 1200 may include more or less elements than these elements.

The host processor 1210 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The MCH 1230 provides control and configuration of memory and input/output devices such as the system memory 1240 and the ICH 1250. The MCH 1230 may be integrated into a chipset that integrates multiple functionalities such as the isolated execution mode, host-to-peripheral bus interface, memory control.

The system memory 1240 stores system code and data. The system memory 1240 is typically implemented with dynamic random access memory (DRAM) or static random access memory (SRAM). The system memory may include program code or code segments implementing one embodiment of the invention. The system memory includes a media delivery module. Any one of the elements of the media delivery module may be implemented by hardware, software, firmware, microcode, or any combination thereof. The media delivery module may include the unicast transmitter, the unicast receiver, the multicast receiver, and the multicast transmitter as discussed above. The system memory 1240 may also include other programs or data which are not shown, such as an operating system.

The ICH 1250 has a number of functionalities that are designed to support I/O functions. The ICH 1250 may also be integrated into a chipset together or separate from the MCH 130 to perform I/O functions.

The mass storage device 1270 stores archive information such as code, programs, files, data, applications, and operating systems. The mass storage device 1270 may include compact disk (CD) ROM 1272, a digital video/versatile disc (DVD) 1273, floppy drive 1274, and hard drive 1276, and any other magnetic or optic storage devices. The mass storage device 1270 provides a mechanism to read machine-accessible media. The machine-accessible media may contain computer readable program code to perform tasks as described above.

The I/O devices $1280_1$ to $1280_K$ may include any I/O devices to perform I/O functions. Examples of I/O devices $1280_1$ to $1280_K$ include controller for input devices (e.g., keyboard, mouse, trackball, pointing device), media card (e.g., audio, video, graphics), network card, and any other peripheral controllers.

Elements of one embodiment of the invention may be implemented by hardware, firmware, software or any combination thereof. The term hardware generally refers to an element having a physical structure such as electronic, electromagnetic, optical, electro-optical, mechanical, electro-mechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc that is implemented or embodied in a hardware structure (e.g., flash memory, ROM, EROM). Examples of firmware may include microcode, writable control store, microprogrammed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described above. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
    means for storing at least a default stream coded by a multiple description (MD) coding and a restart stream coded by a predictive coding, the default and restart streams corresponding to a media content;
    means for selecting a transmit frame from the default and restart streams according to a transmission status, the transmit frame being transmitted to a receiver; and
    means for providing the transmission status based on feedback information provided by the receiver;
    wherein the default stream includes a plurality of description streams that are independently encoded.

2. The apparatus of claim 1 wherein the transmission status is one of a normal condition and a restart condition, the restart condition indicating that there is a frame loss in a description stream of the default stream and that it is time to transmit a frame from the description stream having the frame loss.

3. The apparatus of claim 2 wherein the means for selecting selects the transmit frame from the restart stream when the transmission status is the restart condition.

4. The apparatus of claim 3 wherein the means for selecting selects the default stream after the transmit frame is transmitted.

5. The apparatus of claim 1 wherein the means for providing the transmission status comprises:
    means for tracking delay characteristics of a transmission path; and
    means for keeping track of probing packet to be sent over a transmission path to provide path statistics.

6. The apparatus of claim 5 further comprising:
    means for transmitting the default stream or the restart stream and the probing packets over a transmission path according to the delay characteristics or the path statistics.

7. The apparatus of claim 1 wherein each of the description streams has a different prediction loop.

8. An apparatus comprising:
    means for receiving a stream having a frame from a transmitter over a transmission path, the frame being selected from one of a default stream coded by a multiple description (MD) coding and a restart stream coded by a predictive coding, the default and restart streams corresponding to a media content;
    means for providing feedback information regarding transmission of the stream to the transmitter; and
    means for decoding the stream;
    wherein the means for decoding comprises: means for concealing error caused by packet loss.

9. The apparatus of claim 8 wherein the means for receiving sends an acknowledgment over the transmission path when the stream is received.

10. The apparatus of claim 8 wherein the means for concealing error conceals the error by sending a previously decoded frame or extrapolating previously received frames.

* * * * *